1,759,885

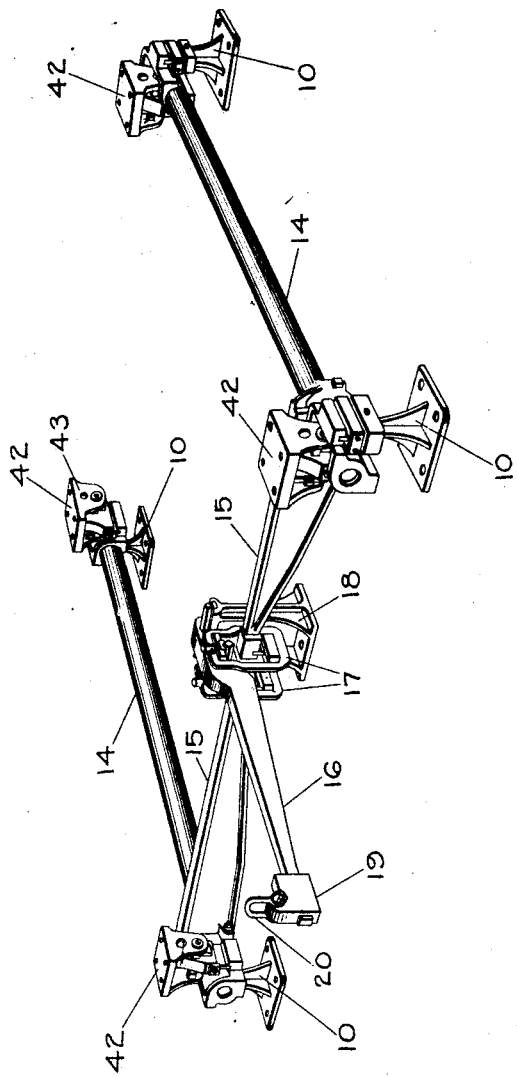

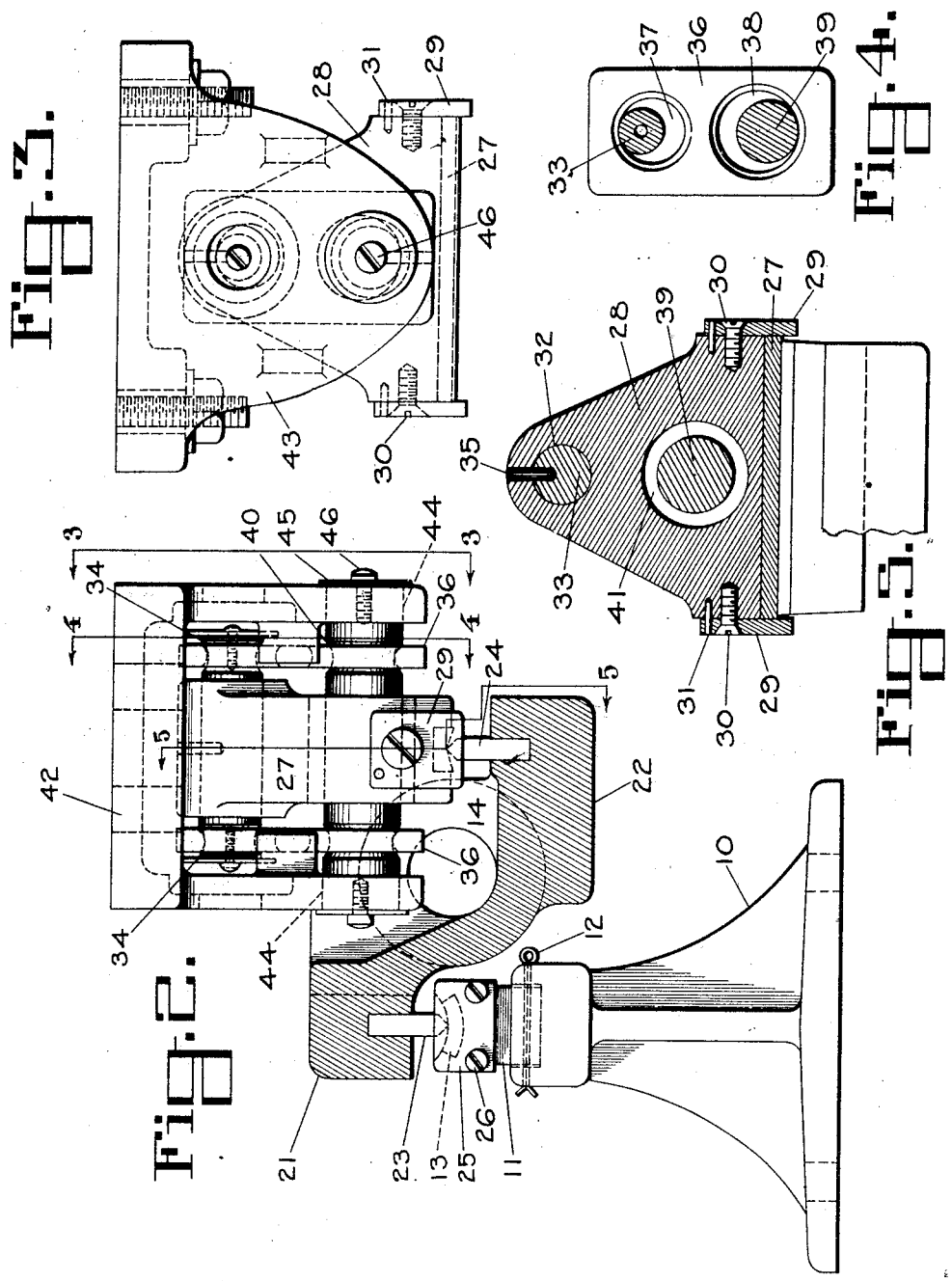
May 27, 1930.  A. BOUSFIELD  1,759,885
SCALE
Filed June 11, 1928   2 Sheets-Sheet 2
INVENTOR
*Alfred Bousfield*
BY
ATTORNEY Patented May 27, 1930

UNITED STATES PATENT OFFICE

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT

SCALE

Application filed June 11, 1928. Serial No. 284,574.

This invention relates to heavy-duty platform scales and more particularly to suspension bearings for such scales. In a scale of the type referred to, it is important that the platform be so supported on the scale levers that it may have freedom of motion when a load is placed on the scale and such platforms are usually supported by means of parallel links in order that they may have a swinging movement in all directions without displacement of the pivots and bearings of the scale. In scales of this type, as commonly constructed, the platforms are pivotally supported on knife-edges and the movement of the platforms results in great wear upon the pivots.

The principal object of this invention is the provision of improved means for supporting scale platforms on the main scale levers whereby such platforms will be free to move in a plurality of planes without producing torsional strain in the levers, the construction being such that the platform is swingingly supported on knife-edge pivots in such a manner that the pivots and bearings will not change their relative position regardless of the movement of the scale platform.

Another object of this invention is to provide a scale construction which permits of easy installation, the construction being such that the bearing organization is superimposed, and is positioned substantially above the pivot line of the scale.

Other objects and advantages of this invention together with certain details of construction and combinations of parts, will be more particularly described in the specifications and pointed out in the appended claims.

In the drawings:

Figure 1 is a perspective view of a lever system embodying my new platform supporting structure;

Figure 2 is an enlarged view of the bearing and girder chair arrangement;

Figure 3 is a side view of the bearing and girder chair arrangement taken on line 3—3 in Figure 2;

Figure 4 is a sectional view showing the link construction, taken on line 4—4 in Figure 2; and Figure 5 is a cross-sectional view taken on line 5—5 in Figure 2, showing the bearing construction.

Similar characters of reference indicate corresponding parts throughout the several views of the drawings.

Referring to the drawings therein the preferred embodiment of my invention is set forth, there is shown a plurality of fulcrum stands, generally indicated by the reference character 10, in each of which is rockably seated a compensating bearing block 11, said bearing block being retained in position by a cotter pin 12. In a concaved upper portion of the bearing block is cast a concave bearing steel 13.

The lever system of the scale comprises pipe levers 14, each of said pipe levers having suitably secured to one end thereof inwardly extending arms 15 which are operatively connected to an extension lever 16 through the medium of stirrups 17. The butt end of the extension lever is fulcrumed on a stand 18 and the tip end has adjustably mounted thereon a nose-iron 19 which is connected to any suitable beam outfit (not shown) through loop 20 pivoted on said nose-iron.

Cast integral with the pipe levers are the lugs 21 and 22 in which are set the fulcrum pivot 23 and the load pivot 24, respectively. The pivot 23 is fulcrumed on compensating bearing 11 which has anti-friction plates 25 attached thereto by means of screws 26.

Pivotally engaging the knife-edge 24 is a V-shaped bearing steel 27 cast in a bearing block 28. The bearing block is substantially of the same length as the pivot 24, as is shown in Fig. 5. Anti-friction plates 29 are fastened to the bearing block adjacent to the ends of the bearing steel by any suitable means, as by screws 30, the plates being prevented from turning by pins 31 set in the plates 29 and entering suitable apertures in the block 28.

The block is substantially of triangular shape in side elevation, and formed transversely thereof near the apex is a circular opening 32. A cylindrical bearing pin 33, having an annular concaved grooved 34 adjacent each end, is tightly mounted in the opening 32 and, as is clearly shown in Fig. 5, the pin is retained in proper position by a dowel pin 35. The purpose of the bearing pin is to provide trunnion on which the means for suspending the platform structure are mounted, such means being disposed in grooves 34, and therefore the parts are so constructed that when the bearing pin is positioned in the block, each of the grooves 34 will be disposed adjacent the side walls of the block but spaced therefrom in order to prevent the suspension means from contacting with the sides of the block.

Perforated loops 36 are preferably employed for suspending the platform structure from the block 28. These loops are substantially rectangular in form and adjacent to the top thereof is formed an annular opening 37 that is slightly larger in diameter than the pin 33 in order that the loop may be readily passed over the end of the pin and seated in the groove 34. Near the bottom of each loop is a second and larger opening 38. In these openings 38, the loops support a pin 39, said pin having grooves 40 adjacent to the ends thereof into which the edges of openings 38 project.

The pin 39 extends through a transverse opening 41 larger in diameter than the pin, the construction being such that there is clearance between the pin and the wall of opening at all times. Mounted on the ends of the pin 39 is a girder chair 42 in the depending legs 43 of which are apertures 44 into which said ends of pin 39 are fitted. The pin is retained in proper position by means of washers 45 and screws 46. The platform, not shown, is adapted to be positioned on the girder chairs, as is well understood in the art.

The construction above described provides, in effect, a universal joint between the scale platform supporting means and the pipe levers. The platform will be suspended in such a manner that it will be free to swing in two planes at right angles to each other, the loops having a parallel motion. In neither of these swinging movements is rocking imported to the bearing block which remains stationary on the load pivot irrespective of the movements of the loops and pin 39. It will readily be understood that all platform movement will be exhausted before reaching the bearing block and thus undue wear on the knife-edges of the pivots is avoided and a high degree of accuracy is insured.

The construction of the scale, it will be noted, permits of easy installation, the bearing and girder chair structures being superimposed upon the load pivot as a unit, the entire unit being substantially above the pivot line of the load pivots.

Having thus described my invention, what I claim as new and desire to secure by Letters Patent of the United States is:

1. In a device of the character described, in combination, a load pivot, a member supported thereon, loops depending from said member, means on said loops threaded through said member and movable relative thereto and platform structure supported on said means.

2. In a device of the character described, in combination, a load pivot, a member supported thereon, loops depending from said member, a pin on said loops threaded through said member and movable relative thereto and platform structure supported on said means.

3. In a device of the character described, in combination, a load pivot, a bearing block superimposed thereon for free tipping movement, parallel loops depending from said bearing block, a pin supported on said loops, said pin being threaded through said bearing block and movable relative thereto and platform structure mounted on said pin and movable therewith.

4. In a device of the character described, in combination, a load pivot, a bearing block superimposed thereon for free tipping movement, a pin fixedly mounted in said bearing block, loops depending from said pin, said loops adapted to move freely in two planes at right angles to each other and platform structure supported by said loops and movable therewith.

5. In a device of the character described, in combination, a load pivot, a bearing block having an aperture therein superimposed on said load pivot for free tipping movement, loops depending from said bearing block, means supported by said loops for movement within said aperture and platform structure mounted on said means and movable therewith.

6. In a device of the character described, in combination, a load pivot, a bearing block having an aperture therein superimposed on said load pivot for free tipping movement, parallel loops depending from said bearing block, a pin supported by said loops, said pin being adapted to move freely in said aperture and platform structure mounted on said pin for movement therewith.

7. In a device of the character described, in combination, a load pivot, a bearing block having an aperture therein superimposed on said load pivot for free tipping movement, a pin mounted in said bearing block, loops depending from said pin, a second pin carried by said loops, said second pin being of smaller diameter than said aperture and adapted to be freely movable therein and platform structure supported on said second pin.

8. In a device of the character described, in combination, a load pivot, a substantially triangular shaped bearing block having an aperture extending transversely thereof superimposed thereon, a pin carried by said bearing block near the apex thereof, suspension means depending from said pin, a second pin carried by said suspension means, said second pin being of smaller diameter than the said aperture and adapted to be freely movable therein and a girder chair mounted for movement with said second pin.

9. In a device of the character described, in combination, a load pivot, a substantially triangular shaped bearing block having a pin near the apex thereof and a transverse aperture adjacent to its base, a pair of loops depending from said pin, a second pin carried by said loops, said pin being of smaller diameter than said aperture and adapted to swing laterally through said aperture and a girder chair mounted on said pin and movable therewith.

In witness whereof, I have hereunto set my hand.

ALFRED BOUSFIELD.